United States Patent [19]
Miyamoto

[11] 3,956,762
[45] May 11, 1976

[54] CAMERA SHUTTER DIAL LOCKING DEVICE

[75] Inventor: Takayoshi Miyamoto, Osaka, Japan

[73] Assignee: Minolta Camera Kabushiki Kaisha, Osaka, Japan

[22] Filed: Nov. 12, 1974

[21] Appl. No.: 523,081

[30] Foreign Application Priority Data
Nov. 27, 1973  Japan.............................. 48-135675

[52] U.S. Cl. ............................................... 354/289
[51] Int. Cl.² ......................................... G03B 17/00
[58] Field of Search................... 354/288, 289, 268; 235/64.7, 91 C

[56] References Cited
UNITED STATES PATENTS

| | | | |
|---|---|---|---|
| 3,505,942 | 4/1970 | Ort...................................... | 354/289 |
| 3,648,581 | 3/1972 | Umemura....................... | 354/289 X |
| 3,742,824 | 7/1973 | Ueda et al. .......................... | 354/289 |

FOREIGN PATENTS OR APPLICATIONS

| | | | |
|---|---|---|---|
| 672,346 | 10/1964 | Italy.................................... | 354/289 |

*Primary Examiner*—Fred L. Braun
*Attorney, Agent, or Firm*—Wolder & Gross

[57] ABSTRACT

A shutter dial releasable locking device for photographic cameras, includes a stationary circular guide member having a number of radially directed stepped portions, a stop member carried by the shutter dial and movable along the circumference of the guide member and biased to engage a stepped portion of the guide member, and a release member biased to project outwardly through a circumferential wall of the shutter dial and adapted to move the stop member in a radial direction of the shutter dial when pressed against a force which biases the release member. When the shutter dial is set in an automatic exposure control position, at a highest shutter speed of manual exposure control or in a mechanical exposure control position, the stop member engages a corresponding stepped portion of the guide member to hold the shutter dial in a position of the selected mode of shutter control.

7 Claims, 12 Drawing Figures

CAMERA SHUTTER DIAL LOCKING DEVICE

BACKGROUND OF THE INVENTION

The present invention relates to an improved shutter dial locking device which functions to block the rotation of a shutter dial and to hold the same in a preset position corresponding to a particular mode of operation.

A conventional photographic camera commonly has a shutter dial which is rotatable for presetting the shutter speed within a range of from 1 second to 1/1000 second and at the same time for selecting the mode of operation among automatic electric exposure control, manual exposure control, X-contact synchronization control and mechanical exposure control wherein the shutter is mechanically operated at a predetermined speed when the electric control fails.

However, if a shutter dial which has been preset to a position of a desired mode of operation is subsequently accidentally or inadvertently moved to a different position, the shutter is operated in a different control mode in the actual photographing operation, giving undesired photographic results. This situation can occur no matter in what position the shutter dial is preset, that is to say, in any one of the positions of the automatic electronic exposure control, the manual exposure control and the mechanical exposure control. As the shutter is controlled in a completely different manner in each one of these operation modes, it is desirable to provide means for holding the shutter in the preset position once it is set in one of these positions.

In FIGS. 8A and 8B of the drawings there is illustrated a conventional stop or lock mechanism which is designed to block the inadvertent shift of the shutter dial, wherein a hollow shutter dial shaft 17 is provided with a release member 18 slideably, longitudinally movable within the hollow space of the shutter dial shaft 17 and with a spring member 19 for biasing the release member to project outwardly beyond the surface of the shutter dial plate. The release member 17 is provided at one end with a stop member 20 for engagement with a longitudinal groove which is formed in the inner wall surface of the shutter dial shaft 17. On the other hand, a number of stepped portions are formed on the inner periphery of the shutter dial shaft bearing, except for those surface portions facing the longitudinal groove. The stop of the releasing member 18 is held in engagement with the longitudinal groove to prevent rotary displacement of the shutter dial only when the dial is preset in the automatic exposure control position. With the known shutter dial stop construction described above, however, in order to release the stop device, it is necessary to finger depress the release member at the center of the shutter dial to lower the stop to the stepped portion. The release member 18 has to be maintained in the depressed state while the shutter dial is rotated into a different position with the other fingers of the hand. This operation is often found difficult and troublesome since the shutter dial, per se, is very small. As the dial setting accordingly requires a two-stepped operation, that is to say, the depression of the releasing member and the rotation of the shutter dial, it is not practical if used in photographing operations which require prompt action. Furthermore, from a structural point of view, it is disadvantageous to provide a stop and a spring within a hollow space of the shutter shaft which is only several millimeters in diameter in view of the difficulties which will be encountered during the manufacturing and machining processes of the shafts. In addition, the blocking of the shutter dial movement has been possible only in the automatic exposure control as the stopper member is designed to engage a longitudinal groove on the shutter dial shaft.

SUMMARY OF THE INVENTION

It is therefore a principal object of the present invention to provide a shutter dial locking or stop device which overcome the aforementioned drawbacks and defects.

It is another primary object of the present invention to provide a shutter dial stop device employing a guide member which is provided with a plurality of steps for engagement with a stop member in such a manner that the shutter dial is blocked against rotation in one particular direction when it is preset in an automatic exposure control position, at the highest speed of the manual exposure control or in a mechanical exposure control position.

It is still another object of the present invention to provide a shutter dial stop device of the nature described above, which has a release member projecting outwardly through a side wall of the shutter dial, so that the two operations of freeing and rotating the shutter dial are effected by one simple manipulation.

It is a further object of the present invention to provide a shutter dial stop device which employs a radially shiftable release member to facilitate the fabrication and machining of the shutter dial shaft.

The above and other objects, features and advantages of the present invention will become clear from the following description and appended claims, taken in conjunction with the accompanying drawings which forms a part of this specification and which show by way of examples preferred embodiments of the present invention.

DESCRIPTION OF THE PREFERRED EMBODIMENTS

Figure 1:
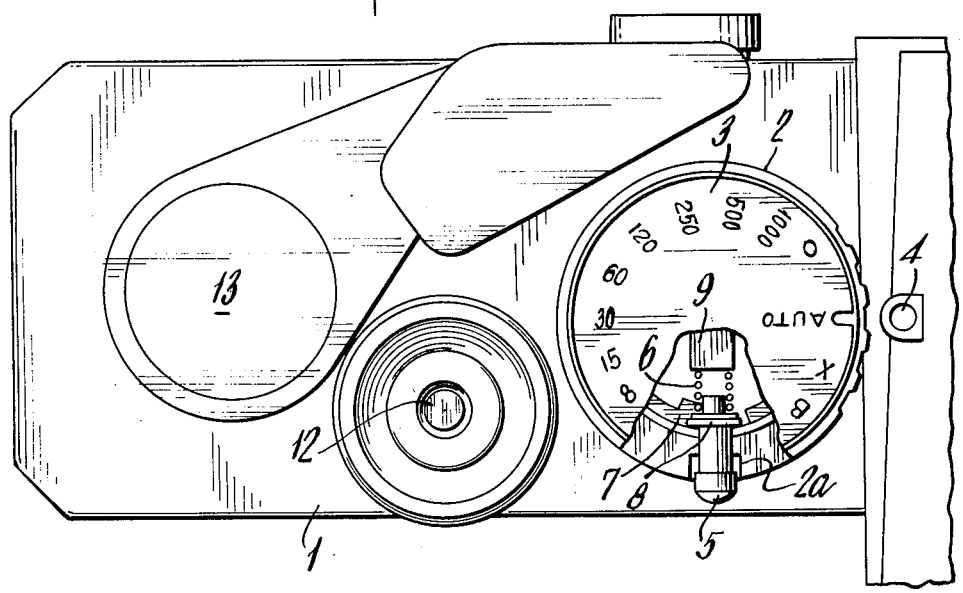
FIG. 1 is a fragmentary, partially sectioned plan view of a shutter dial incorporating a stop device according to the present invention.
Figure 2:
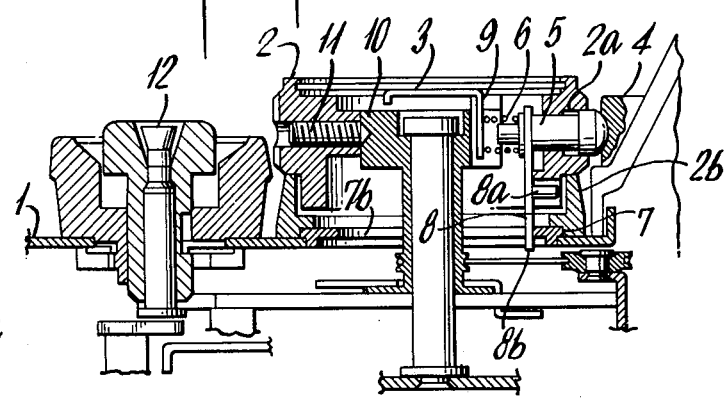
FIG. 2 is a medial vertical sectional view of the shutter dial stop device.
Figure 8A:
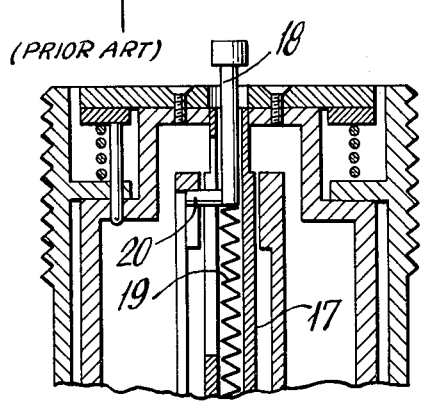
FIG. 8A is a medial vertical sectional view showing the construction of a prior art shutter dial stop device with the dial shaft held in a locked position.
Figure 8B:
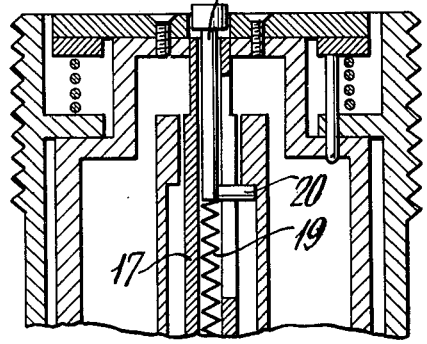
FIG. 8B is a view similar to FIG. 8A but showing the shutter dial shaft in a released position.
Figure 3:
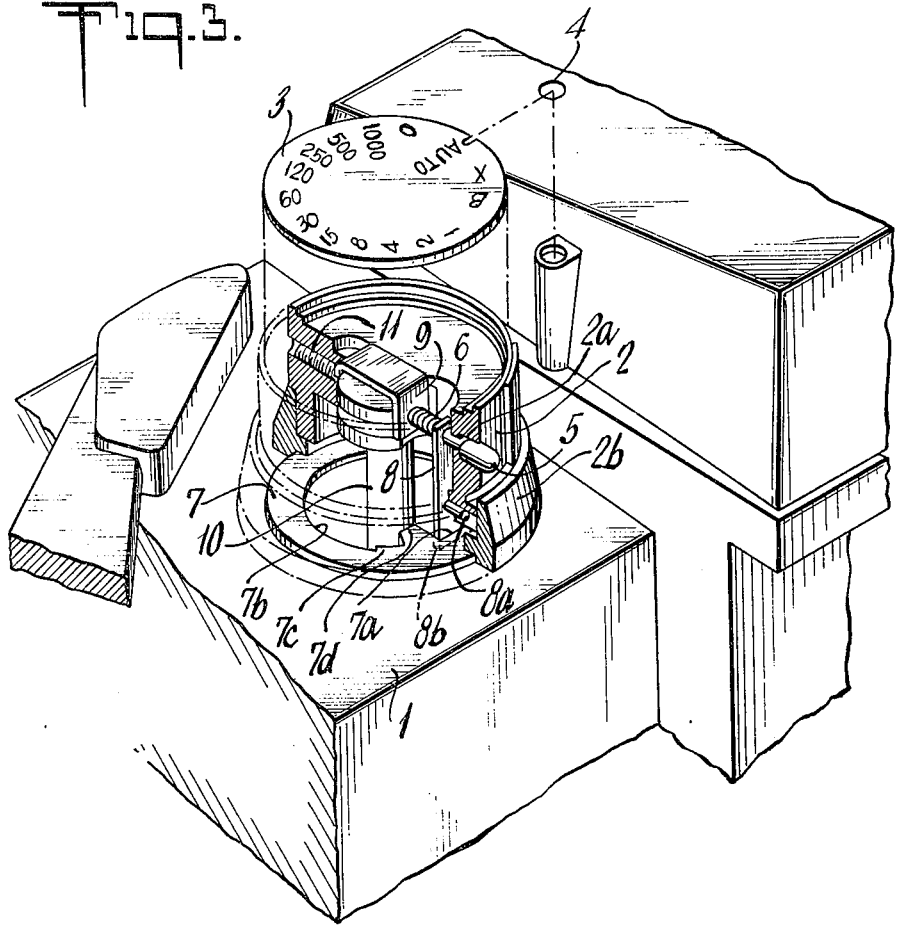
FIG. 3 is a partially sectioned perspective view showing of the shutter dial stopper device.

Referring now to FIGS. 1 to 3 of the drawings which illustrate a preferred embodiment of the present invention, a shutter dial shaft 10 is rotatably mounted on and projects outwardly from a camera body 1 and has a dial knob 2 detachably mounted on the projected outer end of the shaft 10 by means of a screw 11. Designated at 12 is a shutter release button which is provided on the top surface of the camera body 1 in side-by-side relation with the shutter dial knob 2. The reference numeral 13 denotes a film winding lever.

The shutter dial knob 2 has mounted on the upper surface thereof a shutter dial plate 3 which carries thereon the marks of "AUTO", "X", "B", the shutter speeds of 1" to 1/1000" and "O". The shutter can be preset in a selected particular mode of operation by bringing a corresponding mark to register with an index mark 4 on the camera body 1. Thus, when the mark AUTO is in registration with the index mark 4, the shutter is controlled automatically by electronic means, while with the mark X in the position opposing the index mark 4, the shutter is controlled electronically to effect the exposure automatically at 1/60 second. When any one of the shutter speeds of 1" to 1/1000" is manually selected, the exposure is electrically controlled at the selected speed. When the mark B is in registration with the index mark 4, the shutter is ready for a mechanical bulb exposure. With the mark O, which is used where electric exposure control is impossible due to an excessive voltage drop in the power source or a defect or deficiency in the electric circuits, the exposure is effected mechanically at a predetermined standard speed of, for example 1/125 second.

As shown in FIGS. 2 and 3, a release member 5 is loosely and slideably fitted in a bore 2a which is radially formed, through the shutter dial knob 2. The outer end of the release member 5 is resiliently, outwardly projected from the outer periphery of circumference of the shutter dial knob 2 by means of a spring 6 which is interposed between a shouldered portion on the release member 5 and a spring seat 9 which is securely mounted on the shutter dial shaft 10.

The camera body 1 has mounted on the top wall thereof an annular guide plate 7 which has a concentric aperture for receiving therethrough the shutter dial shaft 10. The guide plate 7 is formed with a guide surface along the circular inner peripheral edge thereof as shown particularly in FIGS. 3 and 4A.

The guide surface of the guide plate 7 includes an indented portion 7a, an arcuate portion 7b contiguous to the indented portion 7a in a counter-clockwise direction and radially and inwardly offset raised portion 7c contiguous to and slightly raised from the arcuate portion 7b, and a further radially, inwardly offset protruded portion 7d formed between the raised portion 7c and the indented portion 7a.

The shutter dial shaft release member 5 has secured thereto a stop 8 which in turn has a radially, outwardly extending pin member 8a. The pin member 8a slideably engages a guide groove 2b which is formed radially in the inner wall surface of the shutter dial knob 2. The stop member 8 has a guide follower 8b which extends beyond the guide plate 7 and which is urged to abut against the guide surfaces of the guide plate 7 under the influence of the spring member 6.

When the mark AUTO is in registration with the index mark 4, as shown particularly in FIG. 3, the guide follower 8b of the stop member 8 is engaged with the indented portion 7a in the guide surface of the guide plate 7, inhibiting the relative rotational movement of the guide plate 7 and the shutter dial knob 2. In order to rotate the shutter dial knob 2 under these circumstances, the release member 5 is depressed against the action of the spring 6 to move the stop 8 inwardly, whereupon the lower extension 8b is disengaged from the indented portion 7a of the guide plate 7, thus freeing the shutter dial shaft to allow rotation of the dial knob 2. If the dial knob 2 is rotated counter-clockwise, the guide follower 8b is caused to ride over and move along the arcuate surface 7b of the guide plate 7 to set the shutter at a speed in the range of from 1 second to 1/1000 second of the manual exposure control through the positions of the X-contact synchronization control and bulb exposure control. If it is attempted to rotate the dial knob 2 counter-clockwise past the position of 1/1000 second, the guide follower 8b of the stop 8 is brought into engagement with the stepped portion between the arcuate portion 7b and the raised portion 7c, so that the rotation beyond the manual setting speed of 1/1000" is blocked. In this instance, if the dial knob 2 is rotated counter-clockwise while depressing the release member 5, it can be shifted to O of the mechanical exposure control. However, rotation beyond the position O is blocked by the protruded portion 7d of the guide plate 7.

FIGS. 4B, 5A, 5B, 6A and 6B show modified structures of the guide member, respectively. The guide member of FIG. 5A has an inwardly bulged portion 7e in the arcuate guide surface 7b. When the shutter dial knob 2 is rotated, the release member 5 is rotated in a protruded state together with the dial knob 2 and therefore could possibly contact a pentaprism finder casing or a release button which is usually located in the vicinity of the shutter dial knob 2. In order to avoid such contact with a finder casing or a release button the release member 5 is automatically retracted into the shutter dial knob 2.

Figure 6A:
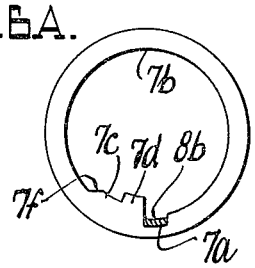
FIG. 6A is a view similar to FIG. 4A but showing a further modified structure of the ring-shaped guide member.

In the modification shown in FIG. 6A the guide plate has a slanted surface 7f between the arcuate portion 7b for the manual exposure time setting and the protruded portion 7d for the mechanical exposure control. In this form, the rotation of the shutter dial knob 2 from the highest speed of 1/1000" of the manual time setting control to the position of mechanical exposure control is resisted to a certain degree. However, the shutter dial knob 2 may be rotated to the mechanical exposure control position without depressing the release member, simply by rotating the knob 2 with a greater force.

Figure 4A:
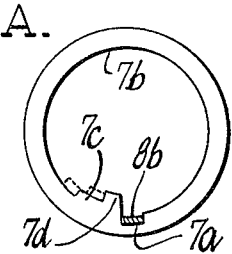
FIG. 4A is a plan view of a ring-shaped guide member employed in the device of FIGS. 1 to 3 and having a guide surface on the inner periphery thereof.
Figure 4B:
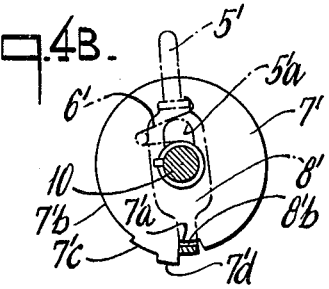
FIG. 4B is a plan view of a generally circular modified guide member having a guide surface on the circumferential surface thereof.
Figure 5A:
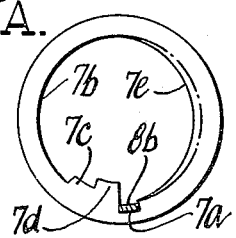
FIG. 5A is a view similar to FIG. 4A but showing a modified structure of the ring-shaped guide member.
Figure 5B:
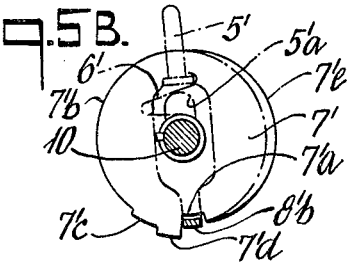
FIG. 5B is a view similar to FIG. 4B but showing a modified structure of the circular guide member.
Figure 6B:
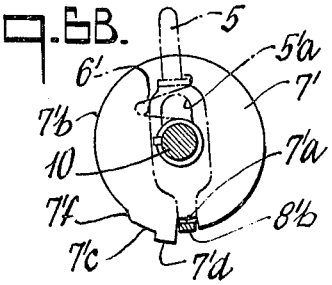
FIG. 6B is a view similar to FIG. 4B but showing a further modified structure of the circular guide member.

The modifications shown in FIGS. 4B, 5B and 6B are different from the embodiments of FIGS. 4A, 5A and 6A in that the guide surface is provided on and along an outer periphery of the guide plate 7. In this case, the release member 5' is provided with a transversely elongated bore 5a' for slideably receiving the shutter dial shaft 10 and with a bent portion 8b' at the other or bottom end thereof for engagement with the guide surface of the guide plate 7'. The release member 5' has its head or finger manipulative portion projected outwardly from the body of the dial knob 2' and the bent portion 8b' at the bottom end abutted against the guide surface of the guide plate 7' by the action of a spring 6'. The guide surfaces of the guide plates in FIGS. 4B, 5B and 6B include the portions 7a', 7b', 7c', 7d', 7e' and 7f' which represent different modes of shutter control as in the embodiments of FIGS. 4A, 5A and 6A.

Figure 7:
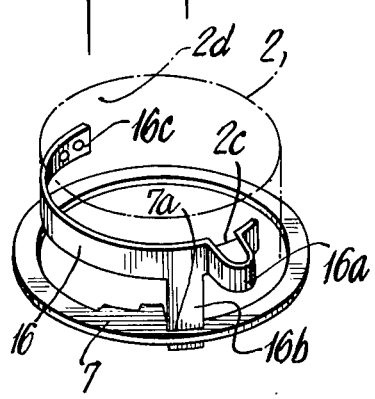
FIG. 7 is a perspective view showing a modified construction of the release member and stop representing other embodiments of the present invention.

In the modification of FIG. 7, the release member, stop and spring are integrally formed of a single resilient sheet 16. The sheet 16 which has the property of restoring to a flat shape by its self-resiliency is bent along the curved inner periphery 2d of the dial knob 2 and has one end secured thereto by means of a fastening pin 16c. The other end of the resilient sheet 16 is bent into a U-shape to form a release member 16a which projects outwardly through an aperture 2c formed at one side of the dial knob 2. A depending guide follower member 16b is formed contiguously to the release member 16a for engagement with the guide surface on the inner periphery of the guide plate 7.

While there have been described and illustrated preferred embodiments of the present invention, it is apparent that numerous alterations, omissions and additions may be made without departing from the spirit thereof.

I claim:

1. In an automatic exposure camera including a camera body, a shutter dial and a rotatable shutter setting shaft, a device for locking the shutter dial comprising:
    a fixed index located on the camera body;
    a hollow shutter dial including a peripheral portion and a shutter dial indicating member having an index designating automatic exposure control and indicia designating manual exposure control values which are movable into registry with said fixed index, said shutter dial being mounted on and rotatable with said shaft and disposed outwardly of the camera body;
    a non-rotatable guide member including an arcuate guide portion having an indented portion formed therein in a radial direction relative to said shutter dial, located in said shutter dial and fixed to the camera body;
    a locking member coupled to and rotatable with said shutter dial and movable along and biased against said guide portion, said locking member being engagable said with said indented portion of said guide member for locking said shutter dial to prevent rotation thereof when said index of said shutter dial indicating member designating automatic exposure control registers with said fixed index; and
    a release member within said shutter dial movable along a path extending beyond said peripheral portion of said shutter dial and biased so that an end portion of said release member projects outwardly of said peripheral portion, said release member being coupled to said locking member so that said locking member is disengaged from the indented portion of said guide member to release said shutter dial and permit rotation thereof when said release member is pushed against its bias.

2. A device as set forth in claim 1, wherein said guide portion of said guide member further includes a second indented portion extending in a radial direction relative to said shutter dial, said locking member engaging said second indented portion when said shutter dial is set to a second predetermined shutter exposure control.

3. A device as set forth in claim 2, wherein said guide portion of said guide member is formed along an inner circumference of said guide member.

4. A device as set forth in claim 2, wherein said guide portion of said guide member is formed along an outer circumference of said guide member 5. A device as set forth in claim 2, wherein said release member is projected outwardly from the circumference of said shutter dial by a spring which is interposed between said release member and a spring seat which is located on said shutter setting shaft.

6. A device as set forth in claim 5, wherein said guide portion of said guide member has a bulged portion, said release member being moved inwardly of said shutter dial when said locking member engages said bulged portion of said guide portion.

7. A device as set forth in claim 1, wherein said locking member and release member are integrally formed of a single resilient sheet.

* * * * *